(12) United States Patent
Mathes

(10) Patent No.: US 10,999,054 B2
(45) Date of Patent: May 4, 2021

(54) METHOD FOR SYNCHRONIZING RADIO FREQUENCY CARRIER CORRECTION OF DYNAMIC RADIO FREQUENCY CARRIERS

(71) Applicant: MOTOROLA SOLUTIONS, INC., Chicago, IL (US)

(72) Inventor: Patrick C. Mathes, Crystal Lake, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 131 days.

(21) Appl. No.: 16/231,256

(22) Filed: Dec. 21, 2018

(65) Prior Publication Data

US 2020/0204337 A1     Jun. 25, 2020

(51) Int. Cl.
*H04L 7/033*     (2006.01)
*H04L 7/06*      (2006.01)
(Continued)

(52) U.S. Cl.
CPC ............. *H04L 7/033* (2013.01); *H04L 7/065* (2013.01); *H04W 56/0015* (2013.01); *H04W 56/0035* (2013.01); *H04W 72/0453* (2013.01)

(58) Field of Classification Search
None
See application file for complete search history.

(56) References Cited

U.S. PATENT DOCUMENTS 6,574,476 B1    6/2003  Williams
6,798,855 B1 *  9/2004  Zirwas ................ H04L 27/2273
                                                     375/327

(Continued)

FOREIGN PATENT DOCUMENTS

EP      2637456 A2    9/2013

OTHER PUBLICATIONS

IEEE, "IEEE Standard for a Precision Clock Synchronization Protocol for Networked Measurement and Control Systems," IEEE Std 1588™ (2008) 288 pages, IEEE Instrumentation and Measurement Society, Sponsored by the Technical Committee on Sensor Technology (TC-9).

(Continued)

*Primary Examiner* — Jeffrey M Rutkowski
*Assistant Examiner* — Mehedi S Aley
(74) *Attorney, Agent, or Firm* — Michael Best and Friedrich LLP

(57) ABSTRACT

A method for synchronizing radio frequency carrier correction of dynamic radio frequency carriers is provided. The method includes receiving a carrier configuration from a carrier controller to modulate a carrier signal based on the carrier configuration and receiving a time reference and timestamped carrier configuration information from the carrier controller. The timestamped carrier configuration information includes a correlation between a plurality of timestamps and a plurality of carrier attributes. The method also includes synchronizing an internal clock of a RF correction preprocessor to the time reference, and receiving a modulated carrier signal from the RF modem. The method further includes generating a radio frequency correction set including a correction solution for each of a plurality of timeslots based on the timestamped carrier configuration information, and generating a corrected carrier signal based on applying the RF correction set to the modulated carrier signal at a coincident timeslot.

14 Claims, 3 Drawing Sheets

(51) Int. Cl.
*H04W 56/00* (2009.01)
*H04W 72/04* (2009.01)

(56) References Cited

U.S. PATENT DOCUMENTS

| | | | |
|---|---|---|---|
| 7,289,773 B2 | 10/2007 | Braithwaite | |
| 8,537,945 B1 | 9/2013 | Ben-Ari et al. | |
| 10,064,149 B1 | 8/2018 | Anvari | |
| 2002/0132631 A1* | 9/2002 | Wesby | H04W 56/0035 455/502 |
| 2005/0101349 A1 | 5/2005 | Pihlajamaa et al. | |
| 2007/0140377 A1* | 6/2007 | Murakami | H04L 27/2628 375/299 |
| 2013/0028192 A1* | 1/2013 | Cheng | H04L 1/004 370/328 |
| 2013/0176170 A1* | 7/2013 | Babitch | G01S 19/26 342/357.65 |
| 2014/0328431 A1 | 11/2014 | Haddad et al. | |
| 2015/0156003 A1 | 6/2015 | Khandani | |
| 2016/0056844 A1 | 2/2016 | Sabiani et al. | |
| 2016/0142988 A1* | 5/2016 | Powell | H04W 56/00 370/338 |
| 2017/0005853 A1* | 1/2017 | Lafuente | H04L 7/0331 |
| 2017/0302388 A1 | 10/2017 | Li et al. | |

OTHER PUBLICATIONS

Combined Search and Examination Report issued by the United Kingdom Intellectual Property Office for Application No. 1917267.5 dated Aug. 21, 2020 (11 pages).

Examination Report No. 1 issued by the Australian Government for Application No. 2019275571 dated Jul. 17, 2020 (8 pages).

* cited by examiner

METHOD FOR SYNCHRONIZING RADIO FREQUENCY CARRIER CORRECTION OF DYNAMIC RADIO FREQUENCY CARRIERS

BACKGROUND OF THE INVENTION

Radio-frequency (RF) signals are transmitted by modulating a carrier wave to encode information into the carrier wave. Radio-frequency (RF) transmitters typically use a single carrier wave having specific carrier attributes, for example, bandwidth, frequency, power level, and the like. RF signals include noise that causes a disturbance in the modulation of the carrier wave and that may interfere with the information being coded into the carrier wave. To remove this noise, RF transmitters include a radio-frequency (RF) correction preprocessor that receives the modulated signal and applies a correction (sometimes referred to as a "correction solution" to reduce or remove the noise in the modulated signal. The RF correction preprocessors are adaptive and have a delay in applying the solution to produce an acceptable amount of correction in the RF signal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
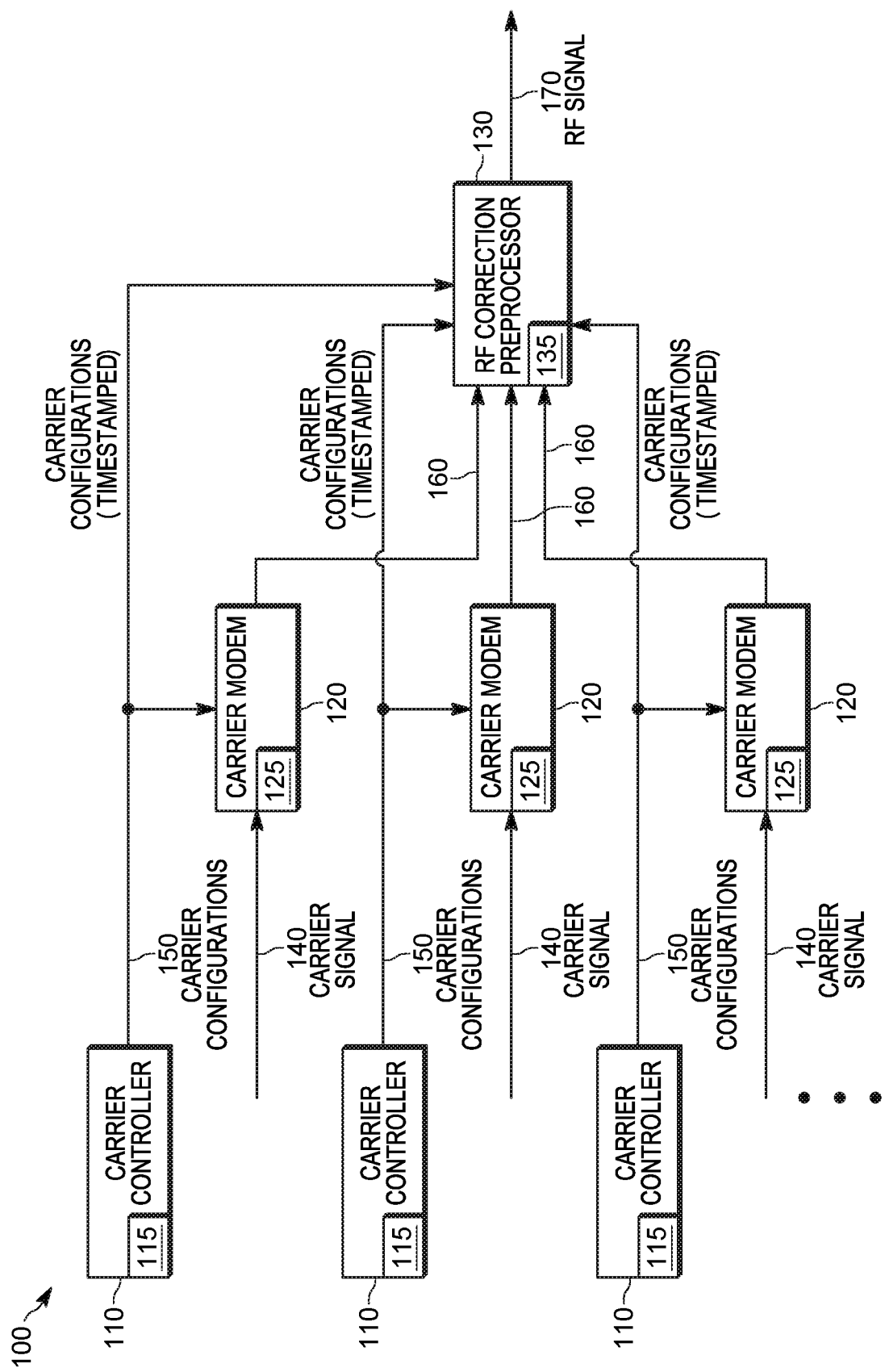
FIG. 1 is a simplified block diagram of a radio frequency (RF) site in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In Land Mobile Radio (LMR) systems, the carrier attributes of the RF signals are dynamic. For example, the bandwidth, frequency, power level, modulation, and the like are changed according to a predetermined schedule. In some situations, the carrier attributes may change before the RF correction preprocessor can achieve an acceptable amount of correction in the RF signal.

Accordingly, there is a need for synchronizing radio frequency carrier correction such that the correction solution can be applied in time to achieve the desired correction in the RF signal.

Broadband multi-carrier power amplifier systems, such as those used in cellular technologies, typically include one or two broadband signals that are sufficiently spaced to reduce inter signal interference. In contrast, LMR systems operate in a narrowband system with multiple inputs and small spacing between the inputs. For example, LMR systems may operate with a bandwidth of about 20 Mega Hertz (MHz) with a spacing of about 100 kilo Hertz between input signals. Appropriate RF correction is therefore more important in LMR systems compared to cellular systems. However, the techniques described below may be applied to other radio frequency signaling systems.

One embodiment provides a radio frequency (RF) site including a carrier controller and a radio frequency (RF) modem coupled to the carrier controller and receiving a carrier configuration from the carrier controller to modulate a carrier signal based on the carrier configuration. The RF site also includes a radio frequency (RF) correction preprocessor coupled to the carrier controller and the RF modem. The RF correction preprocessor is configured to receive a time reference and timestamped carrier configuration information from the carrier controller. The timestamped carrier configuration information includes a correlation between a plurality of timestamps and a plurality of carrier attributes. The RF correction preprocessor is also configured to synchronize an internal clock of the RF correction preprocessor to the time reference and receive a modulated carrier signal from the RF modem. The RF correction preprocessor generate a radio frequency (RF) correction set including a correction solution for each of a plurality of timeslots based on the timestamped carrier configuration information and generate a corrected carrier signal based on applying the RF correction set to the modulated carrier signal at a coincident timeslot.

Another embodiment provides a method for synchronizing radio frequency (RF) carrier correction of dynamic radio frequency (RF) carrier. The method includes receiving, at a radio frequency (RF) modem, a carrier configuration from a carrier controller to modulate a carrier signal based on the carrier configuration and receiving, at a radio frequency (RF) correction preprocessor, a time reference and timestamped carrier configuration information from the carrier controller. The timestamped carrier configuration information includes a correlation between a plurality of timestamps and a plurality of carrier attributes. The method also includes synchronizing, using the RF correction preprocessor, an internal clock of the RF correction preprocessor to the time reference, and receiving, at the RF correction preprocessor, a modulated carrier signal from the RF modem. The method further includes generating, using the RF correction preprocessor, a radio frequency (RF) correction set including a correction solution for each of a plurality of timeslots based on the timestamped carrier configuration information, and generating, using the RF correction preprocessor, a corrected carrier signal based on applying the RF correction set to the modulated carrier signal at a coincident timeslot.

FIG. 1 is a simplified block diagram of a RF site 100 in accordance with some embodiments. The RF site 100 is, for example, a land mobile radio base station site deployed by a public safety organization (for example, a police department, a fire department, and the like). The RF site 100 includes a plurality of carrier controllers 110, a plurality of radio-frequency (RF) modems 120, and a radio-frequency (RF) correction preprocessor 130. The RF site 100 may include more or fewer components than those illustrated in FIG. 1 and may perform more or fewer functions than those described herein. The RF site 100 may be a collocated multi-carrier system as shown in FIG. 1 or a single carrier system including one instance of a carrier controller 110 and one instance of a RF modem 120 coupled to the RF correction preprocessor 130. In one example of the RF site 100, the plurality of carrier controllers 110 and the plurality of RF modems 120 may be distributed physically across different locations and modulated carrier signals 160 from the plurality of RF modems 120 are routed to the RF correction preprocessor 130. The RF site 100 is a dynamic carrier system where the carrier attributes vary over time.

Each carrier controller 110 of the plurality of carrier controllers 110 is communicatively coupled to a corresponding one of the plurality of RF modems 120 and the RF correction preprocessor 130. Each carrier controller 110 includes a controller clock 115 (for example, an internal clock of the carrier controller 110) that provides a clock signal for operation of the carrier controller 110. The plurality of carrier controllers 110 determine the carrier attributes using attribute configuration methods. The carrier attributes include, for example, frequency, bandwidth, modulation, carrier power, keyed state, and the like of carrier signals 140. The carrier attributes are determined based on the requirements of the system and the data being transmitted by the RF site 100. The organization deploying the RF site 100 may set certain specifications for the RF site 100 that includes information regarding the dynamic carrier attributes. Each carrier controller 110 determines carrier configuration for the corresponding carrier signal 140 that is received by the corresponding RF modem 120. The carrier configuration includes timestamped carrier configuration information including a correlation between a plurality of timestamps and a plurality of carrier attributes. The plurality of carrier controllers 110 provide carrier configuration signals 150 to the corresponding ones of the plurality of RF modems 120 and the RF correction preprocessor 130. The carrier configuration signals 150 are provided as, for example, Ethernet packets to the plurality of RF modems 120 and the RF correction preprocessor 130.

Each RF modem 120 of the plurality of RF modems 120 includes a modem clock 125 (for example, an internal clock of the RF modem 120) that provides a clock signal for operation of the RF modem 120. The plurality of RF modems 120 receive carrier signals 140 that are generated by, for example, a carrier signal generator (not shown). The plurality of RF modems 120 modulate the carrier signals 140 to encode information onto the carrier signals 140 and generate modulated carrier signals 160. The plurality of RF modems 120 output the modulated carrier signals 160 to the RF correction preprocessor 130.

The RF correction preprocessor 130 includes a preprocessor clock 135 (for example, an internal clock of the RF correction preprocessor 130) that provides a clock signal for operation of the RF correction preprocessor 130. The RF correction preprocessor 130 receives the modulated carrier signals 160 from the RF modems 120 and applies correction solutions to the modulated carrier signals 160 to generate corrected carrier signals 170. The corrected carrier signals 170 are transmitted by the RF site 100. The RF correction preprocessor 130 may include correction solutions that are implemented in forward error correction loops, pre-distorter loops and the like to correct the errors in the modulated carrier signals 160. Particularly, the RF site 100 may include power amplifiers (not shown) that amplify the modulated carrier signals 160 for transmission. Pre-distorters and forward error correction loops are used with the power amplifiers to provide appropriate error correction of the modulated carrier signals 160. The RF correction preprocessor 130 delivers the correction solutions to the pre-distorters and the forward error correction loops to correct the modulated carrier signals 160 with minimal delay. In some embodiments, the RF correction preprocessor 130 may be implemented as part of a multi-carrier power amplifier assembly.

Figure 2:
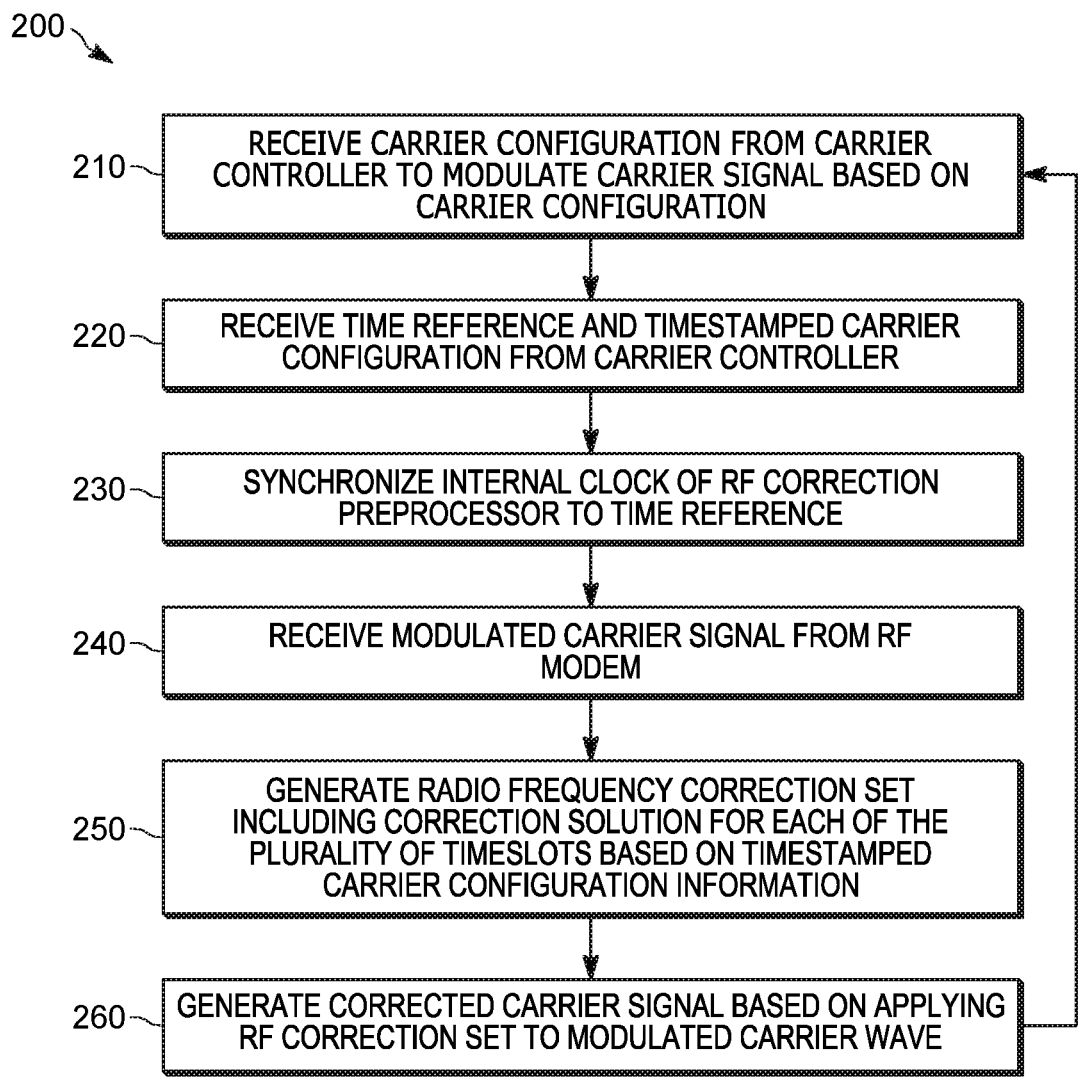
FIG. 2 is a flowchart of a method for synchronizing radio frequency (RF) carrier correction of dynamic radio frequency (RF) carriers in accordance with some embodiments.

FIG. 2 illustrates a flowchart of an example method 200 for synchronizing radio frequency carrier correction of dynamic radio frequency carriers in accordance with some embodiments. The method 200 is described with respect to a single carrier controller 110 and single RF modem 120. However, one of ordinary skill in the art would appreciate that the method 200 is equally applicable among the plurality of carrier controllers 110 and the plurality of RF modems 120. In the example illustrated, the method 200 includes receiving, at the RF modem 120, a carrier configuration from the carrier controller 110 to modulate a carrier signal 140 based on the carrier configuration (at block 210). The RF modem 120 receives carrier configuration signals 150 from the carrier controller 110. The carrier configuration signals 150 include information regarding the carrier attributes that are scheduled to take effect at particular times in the future. The RF modem 120 adjusts the modulation techniques according to the carrier configuration to modulate the carrier signals 140. The modulated carrier signals 160 are then provided to the RF correction preprocessor 130.

Figure 3:
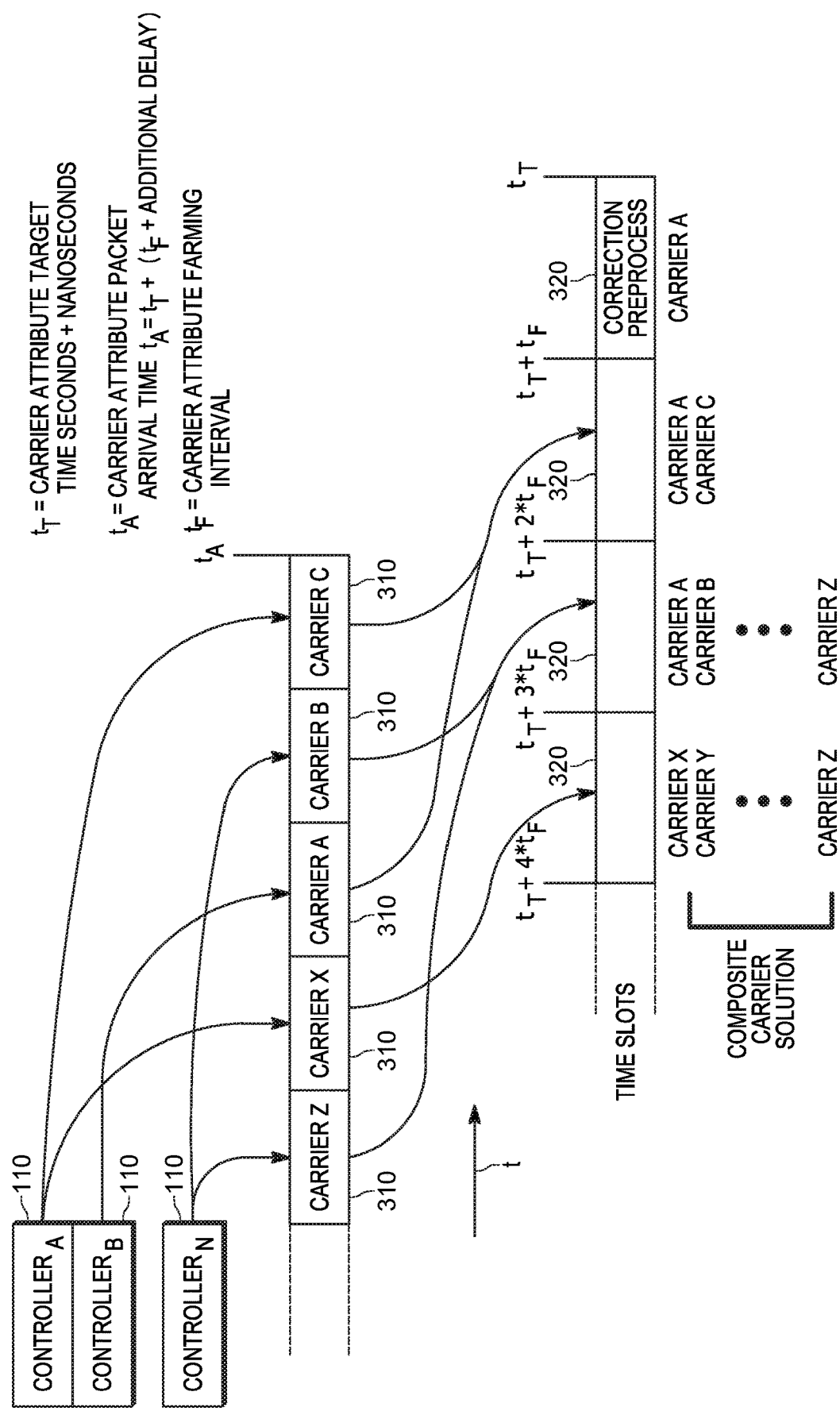
FIG. 3 illustrates a timing diagram of the dynamic RF carriers and the correction preprocessing performed on the carriers in accordance with some embodiments.

The method 200 also includes receiving, at the RF correction preprocessor 130, a time reference and timestamped carrier configuration information from the carrier controller 110 (at block 220). The time reference is, for example, a global positioning system (GPS) time. The carrier controller 110 may first synchronize the controller clock 115 to the time reference before providing the time reference to the RF correction preprocessor 130. The timestamped carrier configuration information includes a correlation between a plurality of timestamps and a plurality of carrier attributes. In one example, the timestamped carrier configuration information includes information regarding when a carrier attribute change of the plurality of carrier attributes is scheduled to take effect. The time at which the carrier attribute change takes effect is referred to as the carrier attribute target time ($t_T$ as shown in FIG. 3) and is the corresponding timestamp of the carrier attribute. The carrier controller 110 compensates for predefined radio-frequency signal propagation, message transmission, and RF correction preprocessing delays in determining the timestamp for each carrier attribute change. For example, as shown in FIG. 3, the timestamp for a particular carrier attribute is the carrier attribute target time $t_T$ and a delay corresponding to one or more of the predefined radio-frequency signal propagation, message transmission, and RF correction preprocessing delays. That is, each of the plurality of timestamps are determined based on a carrier attribute target time $t_T$ of a corresponding one of the plurality of carrier attributes and one or more of a predefined radio-frequency signal propagation delay, a message transmission delay, and a radio frequency correction preprocessing delay. The time reference and the time stamped configuration information are provided through the carrier configuration signals 150. In some embodiments, the time stamped configuration information is the same as the carrier configuration provided by the carrier controller 110 to the RF modem 120.

The method 200 further includes synchronizing, using the RF correction preprocessor 130, an internal clock of the RF correction preprocessor 130 to the time reference (at block 230). Since the changes in the carrier attributes are based on time, using a single time reference for the components of the RF site 100 helps in applying the correction solutions as the appropriate time. The RF correction preprocessor 130 synchronizes the preprocessor clock 135 to the reference time received from the carrier controller 110. In some embodiments, only one carrier controller 110 sends the time reference, while the other carrier controllers 110 only send the carrier configuration information. In some embodiments, the time reference is also provided to the plurality of RF modems 120. The plurality of RF modems 120 synchronize the modem clocks 125 to the time reference. The plurality of carrier controllers 110, the plurality of RF modems 120, and the RF correction preprocessor 130 use known synchronization methods, for example, the IEEE 1588 synchronization method to synchronize respective clock signals.

The method 200 also includes receiving, at the RF correction preprocessor 130, a modulated carrier signal 160 from the RF modem 120 (at block 240). The RF modem 120 modulates the carrier signals 140 based on the carrier configuration information and the message to be transmitted to generate the modulated carrier signal 160. The modulated carrier signal 160 is received by the RF correction preprocessor 130.

The method 200 also includes generating, using the RF correction preprocessor 130, a radio frequency (RF) correction set. The correction set includes a correction solution for each of a plurality of timeslots based on the timestamped carrier configuration information (at block 250). The RF correction preprocessor 130 processes the carrier configuration information to generate discrete timeslots. In one example, each time slot has a certain carrier configuration for each carrier signal 140 and a correction solution for each carrier signal 140 based on the carrier attributes in the timeslots. FIG. 3 illustrates the timeslots generated by the RF correction preprocessor 130.

In the example illustrated in FIG. 3, the plurality of carrier controllers 110 provide carrier configuration information 310 that includes the change in carrier attribute of a carrier signal 140 and the timestamp at which the carrier attribute is scheduled to be changed. The RF correction preprocessor 130 receives the carrier configuration information 310 from the plurality of carrier controllers 110 and divides the information into timeslots 320 having a predetermined time period (for example, the carrier attribute framing interval $t_F$). The plurality of carrier controllers 110 send the carrier configuration information as soon as the carrier controller 110 determine the carrier attribute changes to provide enough time for the RF correction preprocessor 130 to determine a correction solution. The time at which the RF correction preprocessor 130 receives the carrier configuration information is referred to as the carrier attribute packet arrival time $t_A$. In one example, the carrier attribute packet arrival time $t_A$ is configured to be a carrier attribute framing interval $t_F$ and an additional delay before the carrier attribute target time $t_T$. The timeslots 320 are modified as new information is received from the plurality of carrier controllers 110. The carrier configuration information 310 is received before the carrier attribute change is scheduled to take effect such that the RF correction preprocessor 130 can include the carrier attribute change in the appropriate timeslot 320. The RF correction preprocessor 130 then generates correction solutions for each timeslot 320 based on the carrier attributes of the carrier signals 140. A composite solution may be generated to address error correction for each of the carrier signals 140. Generating the correction solution may include the RF correction preprocessor 130 providing the timeslotted carrier information to the correction loops. In some embodiments, the RF correction preprocessor 130 may provide the correction coefficients or selection signals for the correction coefficients to the correction loops of the power amplifiers.

Returning to FIG. 2, the method 200 also includes generating, using the RF correction preprocessor 130, a corrected carrier signal 170 based on applying the RF correction set to the modulated carrier signals 160 at a coincident timeslot 320 (at block 260). The RF correction preprocessor 130 applies the correction set including the correction solutions for each of the carrier signals 140 to generate the corrected carrier signals 170. In some embodiments, the correction loops of the power amplifiers generate the corrected carrier signals 170 selected by the RF correction preprocessor 130. The correction solutions are applied at the beginning of each timeslot 320 and for the duration of the timeslot 320 such that the appropriate correction is achieved without a delay.

The method 200 repeats to receive the next set of attribute changes and preprocess correction solutions for the next set of attribute changes. For example, the method 200 repeats for a second carrier signal 140. That is, the method 200 includes receiving, at a second RF modem 120, a second carrier configuration from a second carrier controller 110 to modulate the second carrier signal 140 based on the second carrier configuration (at block 210). The method 200 also includes receiving, at the RF correction preprocessor 130, a second timestamped carrier configuration information from the second carrier controller 110 (at block 220). The second timestamped carrier configuration information includes a correlation between a second plurality of timestamps and a second plurality of carrier attributes. As discussed above, the time synchronization between the components of the RF site 100 can be performed once to synchronize the clocks of all the components. In some implementations, when the clocks are all synchronized to a single time reference, the time reference is not sent with every timestamped carrier configuration. Rather, the time reference is sent after every few iterations of the method 200. The method 200 further includes receiving, at the RF correction preprocessor 130, a second modulated carrier signal 160 from the second RF modem 120 (at block 240). At block 250, the RF correction preprocessor 130 generates the correction set including the correction solution for both the carrier signal 140 and the second carrier signal 140. For example, as shown in FIG. 3, the RF correction preprocessor 130 generates a composite solution for the carriers X, Y, . . . , Z based on the attributes of the carriers X, Y, . . . , Z at a first timeslot 320 and generates another composite solution for the carriers A, B, Z based on the attributes of the carriers A, B, . . . , Z at a second timeslot 320, and so on. At block 260, the RF correction preprocessor 130 applies the correction set including the composite solutions for each of the carrier waves at that particular timeslot 320. In some embodiments, the method 200 therefore repeats block 210, 220, and 240 for several carrier signals 140 to gather the carrier attribute changes prior to the starting point of timeslot 320. The RF correction preprocessor 130 generates a composite correction solution for each timeslot 320 based on the carrier attribute changes scheduled for the several carrier signals 140.

One advantages of the RF carrier correction techniques described above is that the appropriate correction can be achieved for RF signals transmitted from an RF site 100 even when the carrier attributes are dynamic. Particularly, by operating on a synchronized time and receiving the carrier attribute changes in advance, the RF correction preprocessor 130 may deliver correction solutions to the error correction loops at the start of each timeslot 320 to correct the errors in the transmitted RF signals.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A radio frequency (RF) site comprising:
   a first carrier controller;
   a first radio frequency (RF) modem coupled to the first carrier controller and receiving a first carrier configuration from the first carrier controller to modulate a first carrier signal based on the first carrier configuration; and
   a radio frequency (RF) correction preprocessor coupled to the first carrier controller and the first RF modem and configured to
   receive first timestamped carrier configuration information from the first carrier controller, the first timestamped carrier configuration information including a correlation between a first plurality of timestamps and a first plurality of carrier attributes,
   receive a first modulated carrier signal from the first RF modem,
   generate a radio frequency (RF) correction set including a correction solution for each of a plurality of timeslots based on the first timestamped carrier configuration information, wherein the correction solution corrects error in the first modulated carrier signal, and
   generate a corrected carrier signal based on applying the RF correction set to the first modulated carrier signal at a timeslot coincident with the first modulated carrier signal;
   further comprising:
   a second carrier controller; and
   a second RF modem coupled to the second carrier controller and receiving a second carrier configuration from the second carrier controller to modulate a second carrier signal based on the second carrier configuration,
   wherein the RF correction preprocessor is coupled to the second carrier controller and the second RF modem and is further configured to
   receive second timestamped carrier configuration information from the second carrier controller, the second timestamped carrier configuration information including a correlation between a second plurality of timestamps and a second plurality of carrier attributes,
receive a second modulated carrier signal from the second RF modem,
wherein generating the radio frequency (RF) correction set is further based on the second timestamped carrier configuration information, and
wherein generating the corrected carrier signal is further based on applying the RF correction set to the first modulated carrier signal and the second modulated carrier signal at the timeslot coincident with the first modulated carrier signal.

2. The RF site of claim 1, wherein the first plurality of carrier attributes includes at least one selected from a group consisting of frequency, bandwidth, modulation, carrier power, and keyed state.

3. The RF site of claim 1, wherein the first plurality of carrier attributes are scheduled take effect at particular times in future.

4. The RF site of claim 1, wherein each of the first plurality of timestamps are determined based on a carrier attribute target time of a corresponding one of the first plurality of carrier attributes and one or more selected from a group consisting of a predefined radio-frequency signal propagation delay, a message transmission delay, and a radio frequency correction preprocessing delay.

5. The RF site of claim 1, wherein the RF correction preprocessor is configured to
receive a first time reference; and
synchronize an internal clock of the RF correction preprocessor to the time reference.

6. The RF site of claim 5, wherein the first RF modem is configured to
receive the time reference from the first carrier controller; and
synchronize an internal clock of the first RF modem to the time reference.

7. The RF site of claim 5, wherein the first carrier controller is configured to synchronize an internal clock of the first carrier controller to the time reference.

8. A method for synchronizing radio frequency (RF) carrier correction of dynamic radio frequency (RF) carrier, the method comprising:
receiving, at a first radio frequency (RF) modem, a first carrier configuration from a first carrier controller to modulate a first carrier signal based on the first carrier configuration,
receiving, at a radio frequency (RF) correction preprocessor, first timestamped carrier configuration information from the first carrier controller, the first timestamped carrier configuration information including a correlation between a first plurality of timestamps and a first plurality of carrier attributes,
receiving, at the RF correction preprocessor, a first modulated carrier signal from the first RF modem,
generating, using the RF correction preprocessor, a radio frequency (RF) correction set including a correction solution for each of a plurality of timeslots based on the first timestamped carrier configuration information, wherein the correction solution corrects error in the first modulated carrier signal, and
generating, using the RF correction preprocessor, a corrected carrier signal based on applying the RF correction set to the first modulated carrier signal at a timeslot coincident with the first modulated carrier signal;
further comprising:
receiving, at a second radio frequency (RF) modem, a second carrier configuration from a second carrier controller to modulate a second carrier signal based on the second carrier configuration,
receiving, at the RF correction preprocessor, second timestamped carrier configuration information from the carrier controller, the second timestamped carrier configuration information including a correlation between a second plurality of timestamps and a second plurality of carrier attributes,
receiving, at the RF correction preprocessor, a second modulated carrier signal from the second RF modem,
wherein generating the radio frequency (RF) correction set is further based on the second timestamped carrier configuration information, and
wherein generating the corrected carrier signal is further based on applying the RF correction set to the first modulated carrier signal and the second modulated carrier signal at the timeslot coincident with the first modulated carrier signal.

9. The method of claim 8, wherein the first plurality of carrier attributes includes at least one selected from a group consisting of frequency, bandwidth, modulation, carrier power, and keyed state.

10. The method of claim 8, wherein the first plurality of carrier attributes are scheduled take effect at particular times in future.

11. The method of claim 8, further comprising determining, using the first carrier controller, each of the plurality of timestamps based on a carrier attribute target time of a corresponding one of the first plurality of carrier attributes and one or more selected from a group consisting of a predefined radio-frequency signal propagation delay, a message transmission delay, and a radio frequency correction preprocessing delay.

12. The method of claim 8, further comprising:
receiving, at the RF correction preprocessor, a time reference; and
synchronizing, using the RF correction preprocessor, an internal clock of the RF correction preprocessor to the time reference.

13. The method of claim 12, further comprising:
receiving, at the first RF modem, the time reference from the first carrier controller; and
synchronizing, using the first RF modem, an internal clock of the first RF modem to the time reference.

14. The method of claim 12, further comprising synchronizing, using the first carrier controller, an internal clock of the first carrier controller to the time reference.

* * * * *